United States Patent [19]

Ghosh

[11] Patent Number: 5,572,262

[45] Date of Patent: Nov. 5, 1996

[54] RECEIVER BASED METHODS AND DEVICES FOR COMBATING CO-CHANNEL NTSC INTERFERENCE IN DIGITAL TRANSMISSION

[75] Inventor: Monisha Ghosh, Mohegan Lake, N.Y.

[73] Assignee: Philips Electronics North America Corporation, New York, N.Y.

[21] Appl. No.: 366,138

[22] Filed: Dec. 29, 1994

[51] Int. Cl.$^6$ .................................................. H04N 5/21
[52] U.S. Cl. .................... 348/607; 348/21; 348/725
[58] Field of Search ........................... 348/21, 725, 723,
348/608, 607, 609, 611, 610, 614, 914;
375/350, 233, 239, 232; 358/167, 36; 455/296;
364/724.19, 724.2, 728.03; H04N 5/21,
5/713

[56] References Cited

U.S. PATENT DOCUMENTS

| | | | |
|---|---|---|---|
| 3,889,108 | 6/1975 | Cantrell | 364/724.19 |
| 4,524,424 | 6/1985 | White | 364/724.19 |
| 5,031,194 | 7/1991 | Crespo et al. | 375/14 |
| 5,195,106 | 3/1993 | Kazechi et al. | 375/12 |
| 5,307,374 | 4/1994 | Baier | 375/11 |
| 5,307,377 | 4/1994 | Chouly et al. | 375/39 |
| 5,307,517 | 4/1994 | Rich | 455/296 |
| 5,323,424 | 6/1994 | Fazel et al. | 375/83 |
| 5,345,476 | 9/1994 | Tsujmoto | 364/724.2 |
| 5,353,306 | 10/1994 | Yamamoto | 375/233 |
| 5,353,307 | 10/1994 | Lester et al. | 375/14 |

FOREIGN PATENT DOCUMENTS

629080A1   12/1994   European Pat. Off. ......... H04N 5/21

OTHER PUBLICATIONS

Keiser, "Broadband Coding, Modulation and Transmission Engineering", 1989, pp. 4–5, 208–209.
"Adaptive Filters, Structures, Algorithms, and Applications", Michael Honig and David Messerschmitt, Kluwer Academic Publishers, pp. 1–75.
Broadcast Engineering, Sep. 1994, p. 10.
"And The Winner Is VSB . . . Maybe" S. Merrill Weiss, TV Technology, Apr. 1994.
"Adaptive Signal Processing" Bernard Widrow and Samuel D. Stearns, Prentice Hall, pp. 3–29, 99–163, 302–367.
"Principles of Digital Communication and Coding" Andrew J. Viterbi and Jim Omura, pp. 227–300, 411–423.
"Principles of Digital Audio" Ken Pohlmann, pp. 402–403.

Primary Examiner—Victor R. Kostak
Assistant Examiner—Jeffrey S. Murrell
Attorney, Agent, or Firm—Laurie E. Gathman

[57] ABSTRACT

A device and method for removing co-channel conventional television signal interference from a digital signal by using an adaptive filter which tunes to the periodic components of the conventional television signal. The output of the adaptive filter is then subtracted from the received signal to produce an error signal. This error signal is then used to recursively update the taps of the adaptive filter. The invention also relates to the use of the adaptive filter in conjunction with a DFE.

27 Claims, 7 Drawing Sheets

WHERE $D$ IS THE DELAY VALUE OF REFERENCE NUMERAL 42 IN FIG. 5A

RECEIVER BASED METHODS AND DEVICES FOR COMBATING CO-CHANNEL NTSC INTERFERENCE IN DIGITAL TRANSMISSION

BACKGROUND OF THE INVENTION

1. Field of the Invention

The present invention is directed generally to digital signal processing, and in particular to receiver based methods and devices for combating co-channel NTSC interference in digital HDTV transmission.

2. Description of the Prior Art

The Federal Communications Commission and cable television testing organizations such as CableLabs have been evaluating digital television delivery systems in order to choose a new television "standard" which someday will replace NTSC in the United States. These systems all involve digital coding and data compression techniques, for example those utilizing the MPEG algorithms or variations thereof.

The FCC plans to test and approve an advanced television (ATV) standard comprising for example, high definition television (HDTV) and standard definition television (SDTV) digital signals for terrestrial broadcasting. Although the specifics of the standard are yet to be fully tested and agreed upon, the FCC has indicated that the system will initially take the form of a so called "simulcast" approach. The new ATV signals will fit into currently unused television channels (so-called "taboo" channels) and initially co-exist with the conventional analog television signals without co-channel interference.

Figure 1:
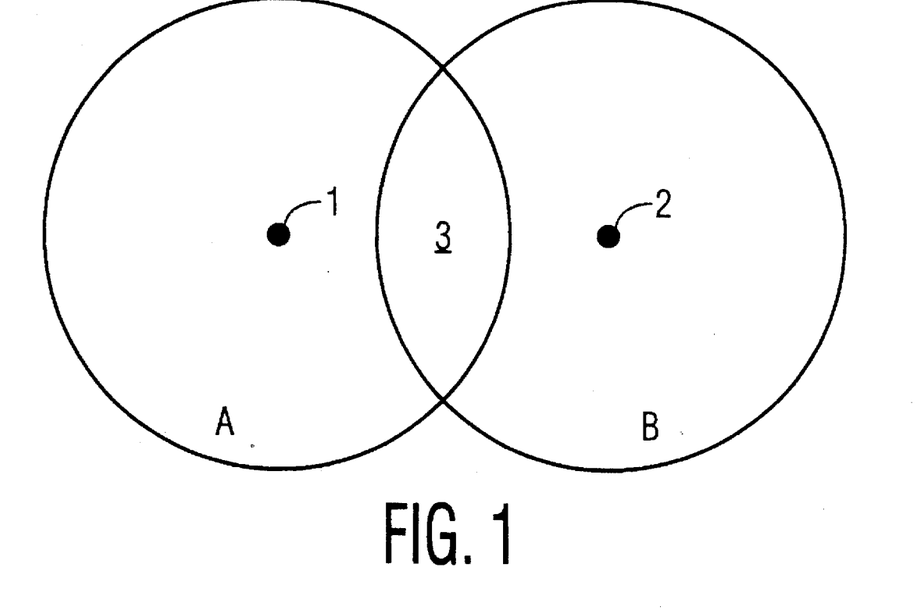
FIG. 1 is a diagram of an area experiencing co-channel interference.

An example of a taboo channel is as follows: FIG. 1 shows two geographical areas A and B. Transmission antenna 1 in area A transmits NTSC channel 6. The FCC will not permit antenna 2 in area B to also transmit NTSC channel 6, as the proximity of antenna 2 to antenna 1 could cause NTSC interference in both areas. Accordingly, if area A is transmitting NTSC channel 6, then channel 6 in area B is a so-called "taboo" channel. Under the planned ATV standard however, The FCC will now permit antenna 2 in area B to transmit ATV signals on channel 6 as the new ATV signals are much more resistant to NTSC interference, although NTSC interference will still be a problem especially in the fringe area 3.

NTSC will be used hereinafter to represent one example of conventional television broadcasting. Other examples would be, inter alia, SECAM and PAL. Although NTSC is exemplified herein, it is not meant to be construed as a limitation and will be used herein synonymously with "conventional" to represent conventional television in general.

The FCC intends to test the so-called "Grand Alliance" digital ATV system, a system which is being cooperatively developed by the corporate sponsors which developed the first round of individual proposals which were tested by the FCC in 1991 and 1992.

The Grand Alliance has already decided on a coding algorithm which will comply with the source coding standards proposed by MPEG (Motion Pictures Experts Group). In addition, the RF transmission scheme selected on the basis of testing conducted by the Advanced Television Test Center (ATTC) is the trellis coded 8VSB system designed and built by Zenith Electronics. The system details are described in "Digital Spectrum Compatible—Technical Details", Sep. 23, 1991 and more recently modified for bakeoff and described in "VSB Transmission System: Technical Details", Sep. 19, 1994, which are incorporated by reference herein. This system is also described in an article in Broadcast Engineering by Chan, entitled "A Look at 8-VSB", September 1994 at page 10, and in TV Technology in an article by Weiss, entitled "And the Winner is VSB. Maybe", April 1994 at page 50 which are hereby incorporated by reference.

The technique used in the Zenith 8VSB modem to combat this co-channel interference is as explained below with reference to FIG. 2.

Figure 2:
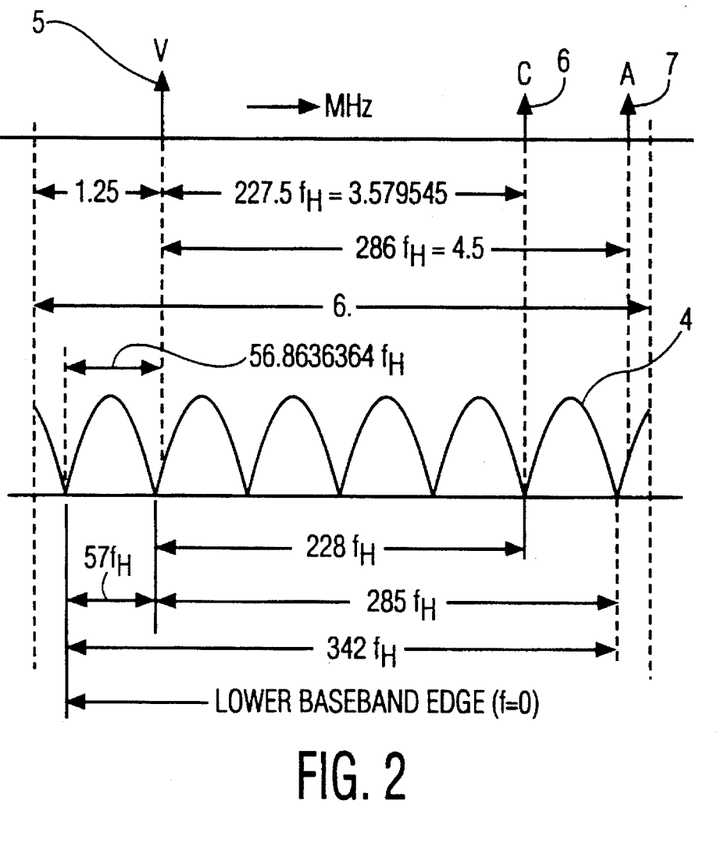
FIG. 2 shows an example of the frequency spectrum of an NTSC co-channel signal and a comb filter response having nulls at the carriers of the NTSC co-channel.
Figure 3:
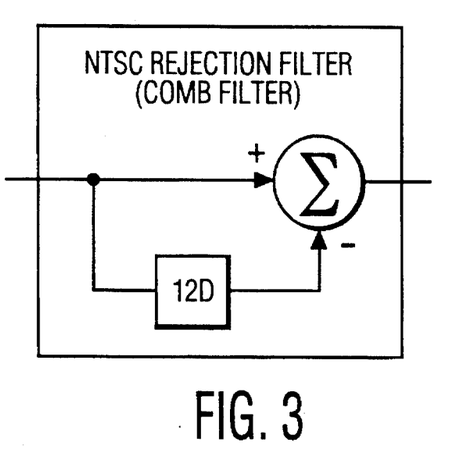
FIG. 3 is a diagram of a comb filter.
Figure 7:
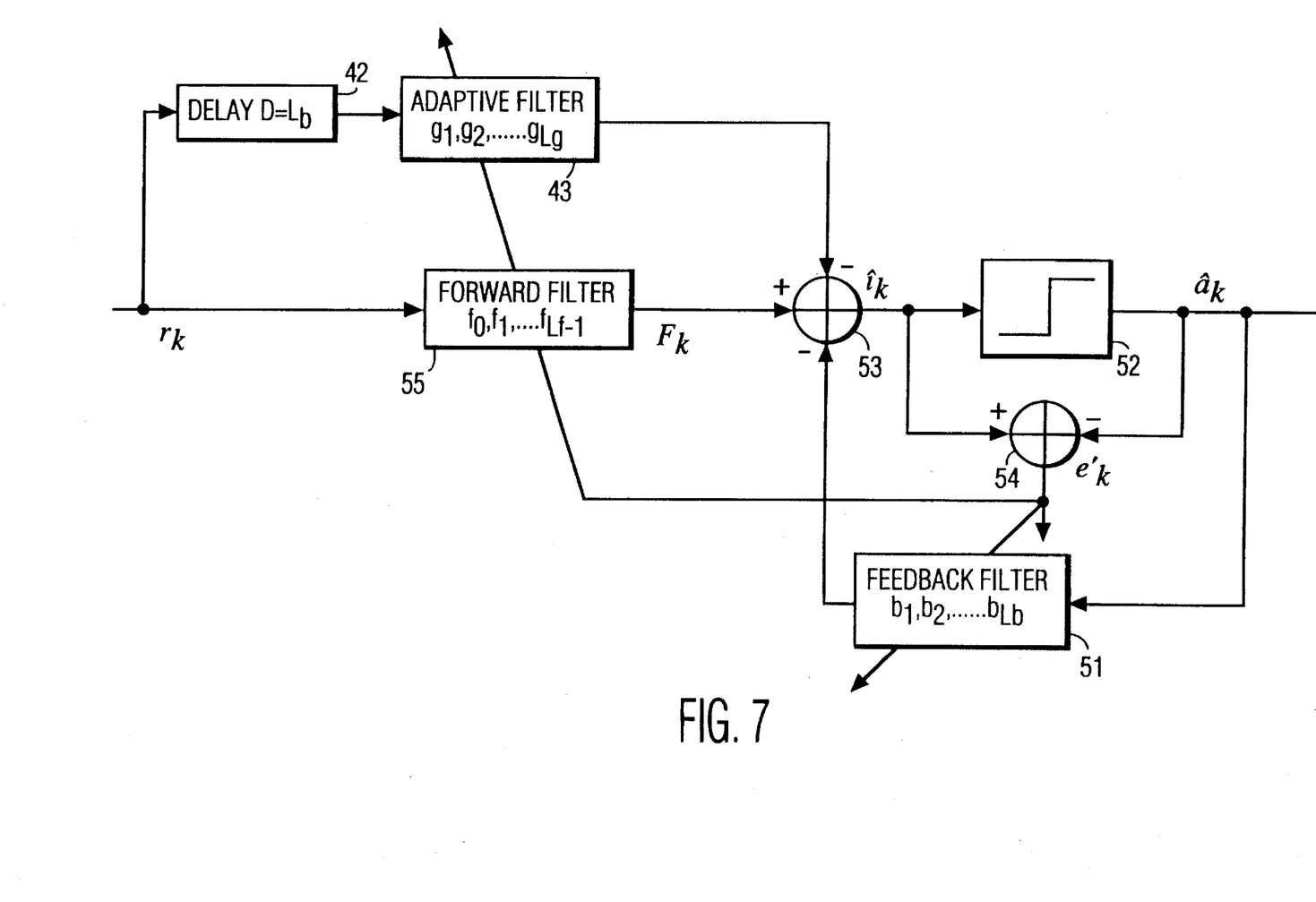

FIG. 2 shows an example of the frequency spectrum of an NTSC signal. The carriers of the picture 5, sound 6 and color 7 of the NTSC signal will cause interference with the digital HDTV signal. In order to remove these "peaks" where the carrier frequencies of the co-channel lie, the Zenith 8VSB modem uses a comb filter in the receiver having a response 4 which introduces nulls, in the digital spectrum at the locations of the carriers of the picture 5, sound 6 and color 3 as shown. The comb filter, shown in FIG. 7, provides rejection of steady-state signals located at the null frequencies. In order to ensure that the nulls align with the correct carrier frequency, the ATV spectrum must be shifted 45.8 khz with respect to the NTSC spectrum, as described at page 15 of "VSB Transmission System: Technical Details", and also delayed by 12 symbols, as described below.

Figure 4:
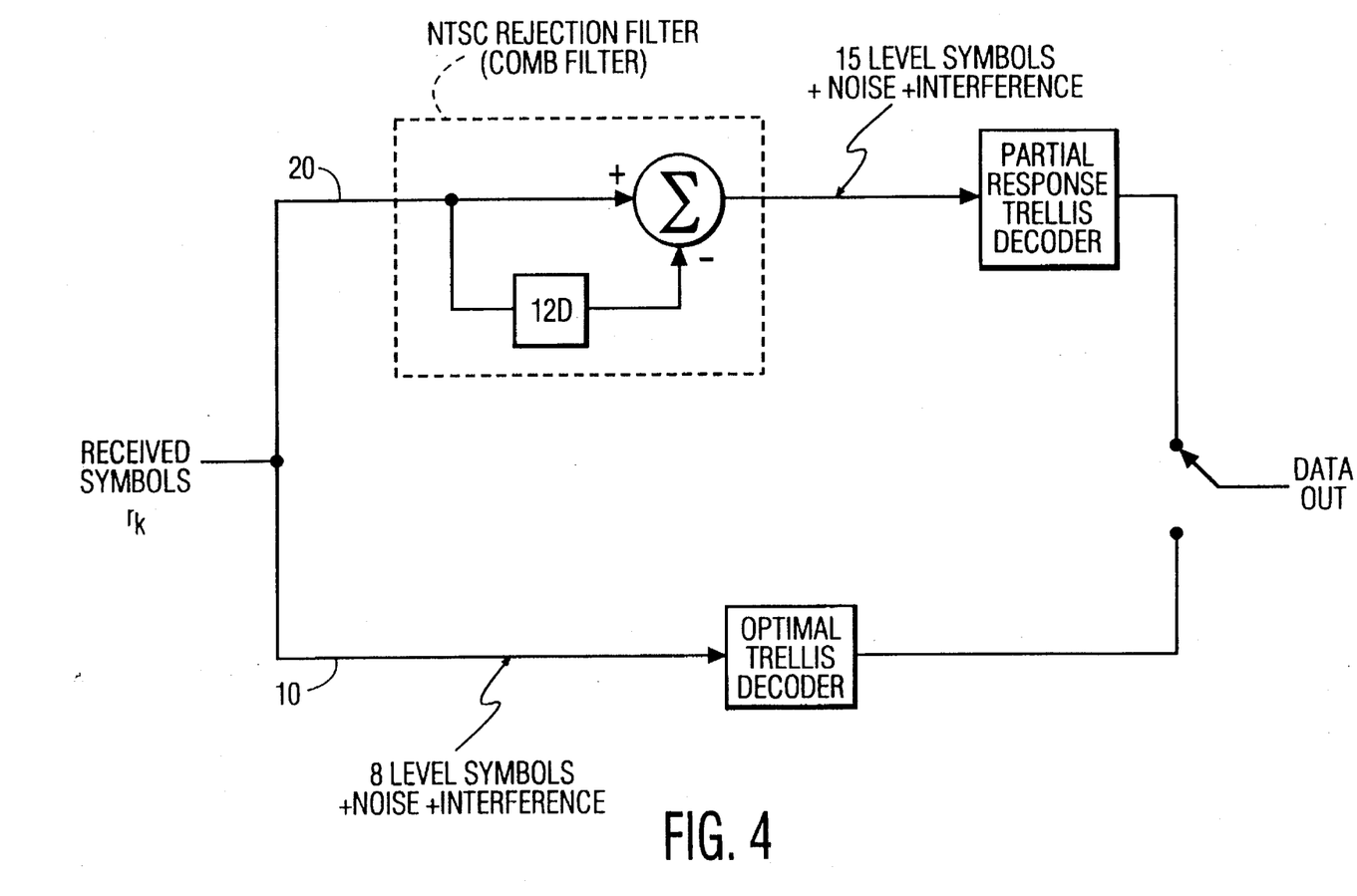
FIG. 4 is a diagram of the prior art which shows the paths of a received signal if the signal contains NTSC interference and if not in a television receiver.

FIG. 4 shows the prior art use of the comb filter in the Zenith system. The comb filter is switched into use when NTSC interference is present in the digital signal, otherwise the comb filter is not used. This provides significant improvement in the performance of the digital signal when a conventional television signal, e.g. NTSC, is broadcast on a co-channel. A general description of a comb filter can be found in Pohlmann "Principles of Digital Audio", 2nd ed. 1991, hereby incorporated by reference.

The comb filter in the prior art is treated as a partial response channel in cascade with a trellis coder, for the case when co-channel conventional television interference is present. An optimum decoder can then be developed which uses Viterbi decoding on an expanded trellis, the states of which correspond to the cascade of the states of the comb-filter and the trellis coder as described in "Principles of Digital Communication and Coding" by Andrew J. Viterbi and Jim K. Omura, 1979 (hereby incorporated by reference) specifically at pages 227–300. The number of states in the trellis becomes increasingly large as the number of delays in the comb filter increase. Accordingly, the trellis coded 8VSB system, which uses a comb filter with a delay of 12 symbols, has an extremely large number of trellis states and also suffers from the problems associated with additive noise.

To simplify their design, Zenith converts the MPEG coded and RS coded and interleaved data-stream from serial to parallel, then uses twelve parallel trellis encoders followed by a parallel to serial converter at the transmitter. Thus now the trellis decoder for the case when the comb filter is used, implements Viterbi decoding on a trellis with the number of states equal to two or four times the number of states of the trellis encoder. The problems associated with additive noise still occur and in fact cause the trellis decoder to work improperly.

When the co-channel conventional television interference is absent, the comb filter is not switched into use and the Viterbi decoding is implemented on a trellis with the number of states equal to the number of states of the trellis encoder. This is possible since, with the Zenith approach, pre-coding is not used in the transmitter. The choice between the path 10, afforded by simple trellis decoding, or of the path 20, which employs the comb filter and the expanded trellis at the receiver, is decided by the measured error-rate of the periodically sent data field sync symbols at the outputs of the post comb and with no post comb. Thus, when there is NTSC interference the comb filter path 20 will be chosen which increases the number of states of the trellis decoder. The switching between the use of a comb filter in the receiver or not, suggested by Zenith, is cumbersome. In addition a significant number of computations must be performed to determine whether the comb filter should be used or not. Also the use of the comb filter requires 12 parallel encoders and correspondingly 12 parallel decoders which is also very cumbersome.

Another problem associated with the present comb filters is that when both NTSC co-channel and all white gaussian noise (AWGN) are present the performance of the comb filter degrades dramatically. This is because the AWGN, after passing through the comb filter, does not remain white, but gets "colored", that is, the noise samples are no longer independent of each other. This "colored" noise affects the performance of the trellis decoder which is optimized for performance in an AWGN channel. Since the co-channel conventional television interference is maximum at the fringe area 3 in FIG. 1, where the signal power is small and hence the AWGN is large, this "coloring" of the AWGN is indeed a scenario which must be taken into account.

The use of a comb filter for NTSC rejection also requires that the ATV spectrum be shifted 45.8 khz with respect to the NTSC spectrum in order to align the nulls of the comb filter with the picture and color carriers as described in "VSB Transmission System: Technical Details", at page 15. This causes the digital spectrum to spill over into the adjacent 6 Mhz channel which is undesirable for adjacent channel rejection.

SUMMARY OF THE INVENTION

Generally speaking in accordance with the present invention an adaptive filter is provided which can dynamically adapt itself to the NTSC spectrum and hence pick out the NTSC interference which is then removed from a received digital signal without the need for a comb filter. The adaptive filter is provided with filter taps which are automatically adjustable for tuning into the periodic components of the NTSC signal without having to use the NTSC signal as a reference signal.

The received input signal r is delayed and then applied to an adaptive filter. The output of the adaptive filter is subtracted from the received signal r. The result of this subtraction, "the error", is used to adjust the taps of the adaptive filter. By minimizing "the error" the adaptive filter becomes tuned to the carriers of the NTSC signal. The NTSC signal is then subtracted from the received signal r leaving only the unpredictable components ("the error") of the received signal. This "error" includes the digital signal and the AWGN and can now be easily processed by simple trellis decoding without the need for a comb filter.

In another embodiment of the invention, the invention incorporates a decision feedback equalizer (DFE) using a finite impulse response filter in the feedback path for combatting intersymbol interference. A forward filter is also provided which removes the pre-echo or ghosts in the received signals. If a DFE is used without any adaptive filter and there is strong NTSC interference in the received signal the taps of the feedback filter become very large which causes an increase in error propagation in the DFE, decreasing the DFE's expected performance of cancelling out the multipaths.

If, however, the adaptive filter is used in conjunction with the DFE, the DFE will try to cancel the signal from the adaptive filter as the DFE believes the signal from the adaptive filter is a multipath which again causes an increase in error propagation. A DFE, however, can only cancel multipaths up to the number of taps in the feedback filter.

Accordingly, it is an object of the invention to provide a DFE in conjunction with an adaptive filter such that the DFE will not cancel the signal from the adaptive filter as a multipath. This is achieved by setting the delay D of the adaptive filter such that it is greater than the number of taps in the feedback filter. In this way the DFE will not attempt to cancel the "multipath" it sees from the adaptive filter, thus the DFE effectively removes ghosts yet error propagation of the DFE is not increased and the NTSC signals are removed by the adaptive filter.

In this embodiment, which includes the DFE, the NTSC signal estimate $\bar{\imath}_k$, is subtracted from the output of the forward filter. The output of the feedback filter is also subtracted from the output of the forward filter. A slicer is provided for quantizing the signal to the nearest symbol. The subtractor compares the input of the slicer to the output of the slicer and provides an error signal $e'_k$ which is used to set the taps of the forward filter and the feedback filter by using an adaptive algorithm. The DFE, at all times, is trying to minimize the error $e'_k$.

Another object of this invention is to avoid the use of the comb filter in the receiver to remove NTSC interference transmitted on a co-channel from a digital signal.

Yet a further object of the invention is to improve the AWGN performance of the trellis encoder/decoder in an ATV receiver when co-channel television interference is not present. This is achieved by not having to use a comb filter which limits the number of states of the trellis encoder due to the fact the Viterbi decoder on a comb filter path must operate on a trellis with at least double the number of states of the trellis encoder.

Yet another object of the invention is to do away with the 45.8 khz frequency offset required with the use of a comb filter.

Yet a further object of the invention is to provide an adaptive filter in conjunction with a DFE, which DFE will not try to cancel the "multipath" produced by the adaptive filter and which will not propagate errors caused by the NTSC signal.

The invention accordingly comprises the methods and features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 5A:
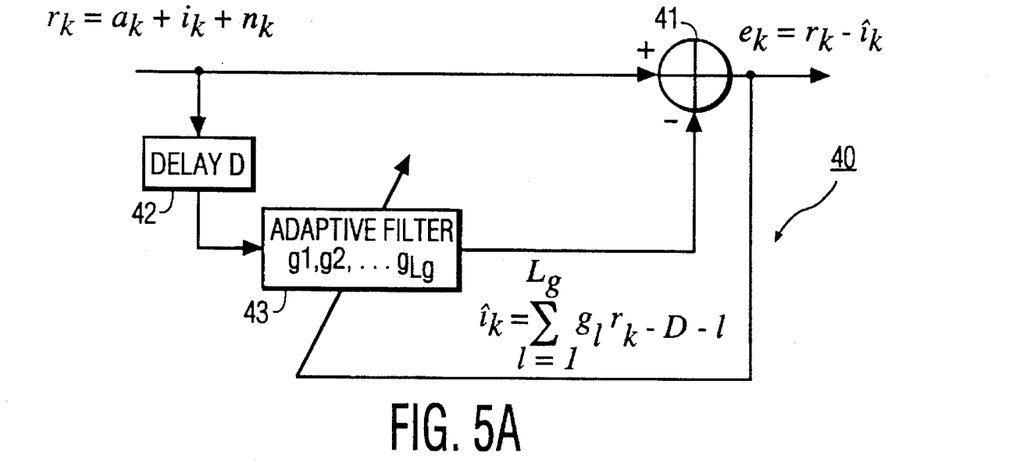
FIG. 5A is a diagram of an adaptive filter for NTSC co-channel interference cancellation in accordance with the invention.

FIG. 5A generally indicates at 40 the basic structure of an adaptive filter for NTSC co-channel interference cancellation ("the filter 40"). The filter 40 includes a delay element 42 an adaptive filter 43 with adjustable taps $g_1 \ldots g_{Lg}$ and a subtractor circuit 41. The input to filter 40 is the sequence $r_k$ which includes the transmitted symbol sequence $a_k$ of a digital signal, the NTSC co-channel interference $i_k$ and the AWGN $n_k$. The output of the adaptive filter is $e_k$, which is the "error" signal formed by subtracting $\hat{i}_k$, which is an estimate of $i_k$, from $r_k$. This "error" signal $e_k$ therefore includes the digital signal $a_k$ plus the AWGN $n_k$. The filter 40 is provided for "tuning" to the carriers or periodic components of the NTSC co-channel interference $i_k$ which carriers are then estimated and subtracted in subtraction circuit 41 from the received signal $r_k$. The output of subtractor circuit 41 is the non-periodic components of the received signal $r_k$, which is the original digital signal $a_k$ plus the additive AWGN $n_k$. The output $e_k$ is then sent to a trellis decoder which is adapted to easily remove the AWGN $n_k$.

The filter 40 is able to remove the NTSC co-channel interference because the received signal $r_k$ is first passed through a delay element 42 having a delay of D symbols. This delay is chosen sufficiently large so as to decorrelate the broadband component of $r_k$ which is $a_k + n_k$. Usually such an adaptive filter requires a reference signal such as the actual NTSC signal being transmitted on the co-channel which is used to generate an error which error is then minimized by tuning the filter taps by the LMS algorithm. In the present case such a reference signal is not needed, and usually not available. As long as the delay D is chosen of sufficient length to decorrelate the broad band noise, the actual NTSC signal transmitted on the co-channel is not needed. The NTSC component, because of the periodic nature of its carriers, will remain correlated. The predictable NTSC component is removed from the received signal leaving only the unpredictable component $a_k + n_k$ at the output.

Figure 5B:
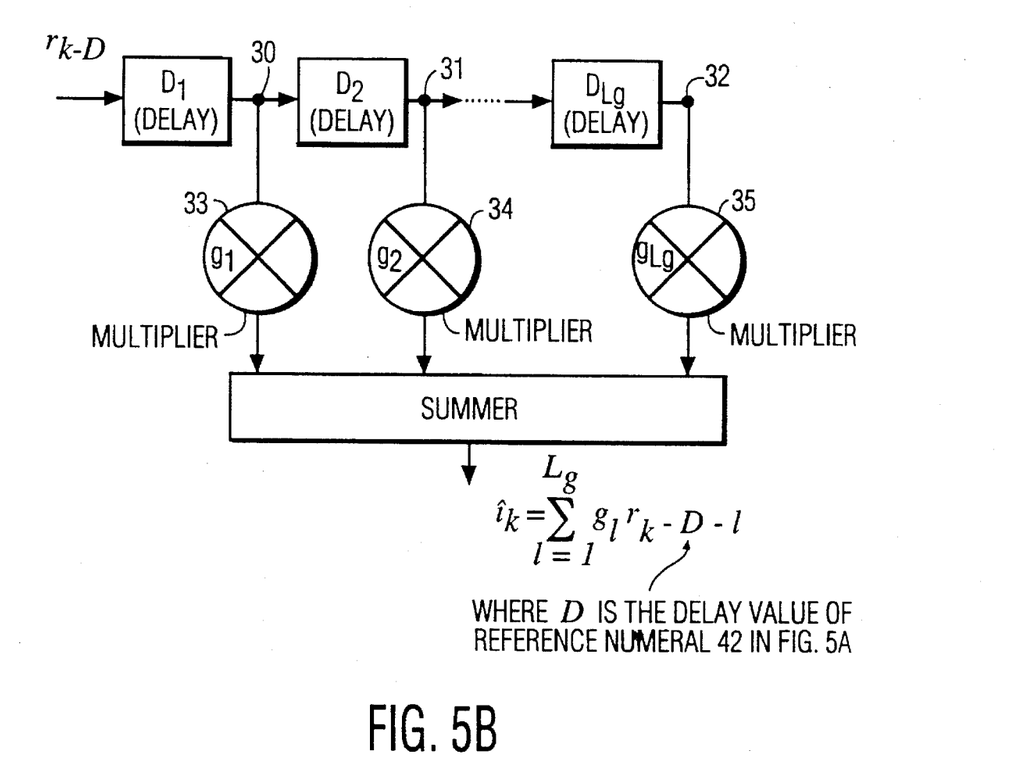
FIG. 5B is a more detailed diagram of the adaptive filter 43 shown in FIG. 5A.

When there is no multipath, D can be set to 1 since both the signal and noise components are white. The situation with multipath will be discussed later. Following the delay D is the adaptive filter 43 with adjustable taps $[g_1, g_2, \ldots g_{lg}]$, which are shown more clearly in FIG. 5B. The output of the adaptive filter 43, denoted by $\hat{i}_k$, is given by:

$$\hat{i}_k = \sum_{l=1}^{Lg} g_l r_{k-D-l}$$

As explained above, the error signal $e_k$, which is representative of the digital signal in conjunction with the AWGN $n_K$ is formed by subtracting the NTSC co-channel interference estimate $\hat{i}_k$ from $r_k$ i.e.

$$e_k = r_k - \hat{i}_k$$

The filter taps $[g_1, g_2, \ldots, g_{lg}]$ are then obtained by minimizing the mean squared error $E[e_k^2]$ with respect to the taps. The theoretical expression for the optimum taps involves exact knowledge of the correlation properties of the NTSC interference which are obviously not available to the receiver. Hence an adaptive algorithm is used to update the taps in the adaptive filter 43 which minimizes the mean squared error. Although it should be noted that other adaptive algorithms besides the LMS algorithm may be used to adjust the taps. The LMS algorithm for this adaptive filter is thus given by the following update recursion for the taps:

$$g_{n+1} = g_n + 2\mu e_n r_n$$

where n denotes the iteration number, $\mu$ denotes the step size of the algorithm, g is the vector of filter taps $[g_1, g_2, \ldots, g_{lg}]^T$ and $\underline{r}$ is the vector of received symbols $[r_{k-D-1}, r_{k-D-2}, \ldots, r_{k-D-Lg}]^T$ used to form the estimate $\hat{i}_k$. (See Widrow and A Stearns, "Adaptive Signal Processing", (hereby incorporated by reference), at pages 99–116) Simulation results with the color bar signal show that this algorithm converges in about 1000 iterations to the optimum tap values. The minimum mean squared error obtained with a 100 tap filter when there is no noise and the DUR, desired to undesired ratio, which is the ratio of the power of the desired (digital signal) to the undesired (NTSC interference signals) is 0 db results in a DUR of 8.66 dB in the output signal, i.e. the adaptive filter has succeeded in attenuating the NTSC co-channel interference by 8.66 dB. At the same time, since the adaptive filter is basically a predictor, it can be shown that the prediction error is a white process, (see Widrow and Stearns), hence there is no noise coloration.

From the above discussion we see that the adaptive filter becomes matched to the NTSC spectrum "blindly" i.e. no reference NTSC co-channel signal or reference data stream is required for adaptation.

FIG. 5B is a more detailed diagram of the adaptive filter 43. A plurality of delay line segments $D_1, D_2 \ldots D_{Lg}$ form a tapped delay line. Each of the delay line segments $D_1, D_2 \ldots D_{Lg}$ are coupled at points 30, 31 ... 32 to a respective multiplier 33, 34, ... 35 having respective tap coefficients $g_1, g_2 \ldots g_{Lg}$.

As explained above, since the NTSC co-channel interference is initially unknown an adaptive algorithm must be used to adjust the value of the multiplier taps $g_1, g_2 \ldots g_{Lg}$. By selecting the adjustable multiplier taps $g_1, g_2 \ldots g_{Lg}$ to minimize the means squared error as explained above, it can be shown that the minimum of the mean squared error will occur when the adjustable multiplier taps $g_1, g_2 \ldots g_{Lg}$ are tuned to the carriers of the NTSC co-channel interference. That is, when the frequency response of the adaptive filter 43 defined by the adjustable multiplier taps $g_1, g_2 \ldots g_{Lg}$ matches the frequency response of the NTSC co-channel interference the mean squared error will be minimized.

Figure 6:
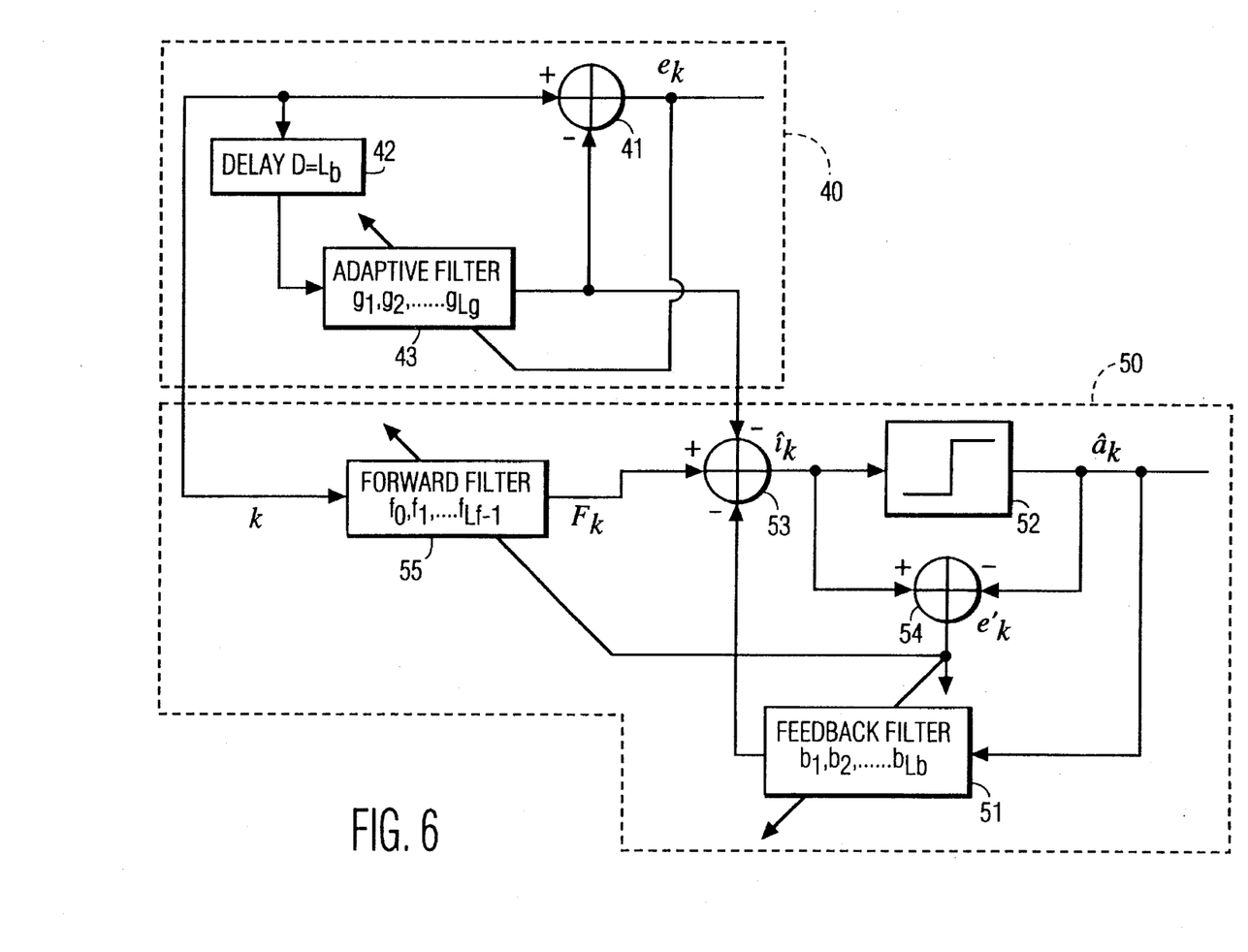
FIGS. 6 and 7 are diagrams of an adaptive filter in conjunction with a DFE in accordance with the invention.

FIG. 6 shows a second embodiment of this invention which includes a DFE 50 and the filter 40. The DFE includes a forward filter 55, a feedback filter 51, a slicer 52, and subtractors 53 and 54. The DFE 50 removes multipaths such as pre-echoes or ghosts. If the DFE 50 is subject to NTSC interference the taps of the feedback filter 51 become quite large which increases error propagation. That is, if an error is made in determining the symbol $a_k$ at the output of slicer 52, this incorrect symbol is fed back to the input of the filter 51 and into future tap coefficients of the forward filter 55 and the feedback filter 51. If the delay 42 is set to a delay period which is less than the number of taps in the feedback filter 51 then the DFE 50 will treat the estimated NTSC cochannel interference $\hat{i}_k$, received from filter 40, as a multipath and attempt to cancel it which is not wanted. Because the number of multipaths the DFE 50 can cancel is related to the number of taps in the feedback filter 51, that is the DFE 50 can only cancel at most Lb multipaths, by setting the delay D equal to Lb the DFE will not attempt to cancel this multipath. Thus, the error propagation through the DFE is reduced.

The embodiment shown in FIG. 6 uses a finite length (FIR) transversal feedback filter 51 for combatting intersymbol interference. The feed forward path uses a forward (FIR) filter 55, for cancelling ghosts and a slicer 62 for quantizing the received signal to the nearest symbol $a_k$. General filter operation is explained in U.S. Pat. No. 5,031,194 which is hereby incorporated by reference. The delay length D of the adaptive filter 40 is set to the number of taps $L_b$ of the feedback filter 51. The taps of the feedback filter 51 and the forward filter 55 are set by the error $e'_k$ produced by subtractor 54 using the LMS algorithm. The estimated NTSC portion of the received signal $\hat{i}_k$, estimated by the adaptive filter, is subtracted from the forward filtered received signal $F_k$. The intersymbol error from the feedback filter 51 is also subtracted from the forward filtered received signal $r_k$. The result of this subtraction is quantized to the nearest symbol and produced at the output of slicer 52 as $\hat{a}_k$, which is an estimate of $a_k$. The input of slicer 62 is then sent to the trellis decoder (not shown).

The first DFE structure, shown in FIG. 6, uses the error $e_k$ to adjust the taps $g_1 \ldots g_{Lg}$ of the adaptive filter 43 and the symbol error $e'_k$ to adjust the filter taps $f_0 \ldots f_{Lf-1}$ for the forward filter 55 and the taps $b_1 \ldots b_{Lb}$ for the feedback filter 51. A second DFE structure, shown in FIG. 7 uses the error $e'_k$ to adjust all the coefficients, i.e. those of the adaptive filter 43 as well as those of the forward filter 55 and the feedback filter 51. The drawback with the second approach shown in FIG. 7 is that the filter adaptation becomes dependent on the training sequence for initialization. In both cases, the delay D is set greater than or equal to $L_b$, the number of taps in feedback filter 61. This prevents the feedback filter portion of the DFE from cancelling the effect of g and hence leading to error propagation. However if multipath is present, the feedback portion helps equalize it. Setting D equal to the number of symbols in one NTSC line will provide the best performance since the correlation between lines is very high. Thus this structure enables the use of the DFE for equalization alone and does not contribute to error propagation when co-channel interference is present.

Figure 8:
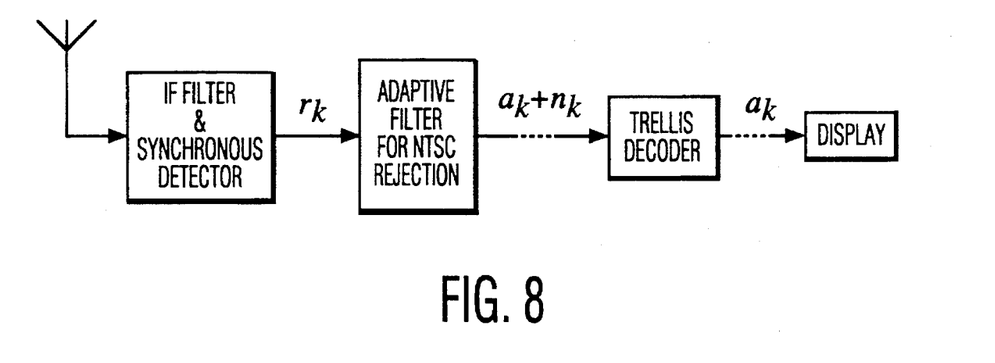
FIG. 8 is a diagram of the components of a television receiver including an adaptive filter.

FIG. 8 is a block diagram of a television receiver in accordance with the invention. The received signal is IF filtered and then adaptively filtered to remove the NTSC co-channel interference. The trellis decoder then removes the AWGN $n_k$ which leaves only the digital signal to be displayed.

As can be readily appreciated, the invention provides a method and apparatus for quickly and simply removing the NTSC co-channel interference from a digital signal.

It will thus be seen that the objects set forth above, and those made apparent from the preceding description are efficiently obtained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention, which, as a matter of language, might be said to fall therebetween.

What is claimed is:

1. A method of removing co-channel conventional television signal interference from a digital signal, comprising the steps of:

receiving the digital signal which includes a plurality of symbols, noise and co-channel conventional television signal interference;

delaying the received digital signal;

adaptively filtering the delayed signal using a feed forward adaptive filter having a plurality of adjustable taps;

subtracting the adaptively filtered signal from the received digital signal and producing an error signal; and recursively using the error signal to adjust the taps of the adaptive filter to minimize the mean squared error of the error signal such that the adaptive filter becomes tuned to the co-channel conventional television signal interference.

2. The method in accordance with claim 1 wherein $g \ldots g_{Lg}$ represent the adjustable forward adaptive filter taps and the step of adjusting the taps is performed by determining the value of the adjustable forward adaptive filter taps in accordance with the following update recursion $g_{n+1} = g_n + 2ue_n r_n$ wherein g is a vector of the adjustable forward adaptive filter taps, u denotes the step size of the LMS algorithm, e is the error signal, $r$ is a vector of the received digital signal and n refers to the iteration value.

3. The method in accordance with claim 1, wherein the step of adaptively filtering produces an output defined as $$\hat{i}_k = \sum_{l=1}^{Lg} g_l r_{k-D-l}$$

where $\hat{i}_k$ is an estimate of the co-channel conventional television signal interference, Lg is the number of adjustable taps, $g_l$ represents each adjustable filter tap, r is the received digital signal, k represents a particular symbol of the received digital signal and D is the delay length.

4. The method in accordance with claim 1, further including the step of decision feedback equalizing the received digital signal.

5. The method in accordance with claim 4, wherein the step of decision feedback equalizing includes the steps of forward filtering the received digital signal using a forward filter having a plurality of filter taps;

subtracting the estimate of the co-channel conventional television signal interference from the forward filtered signal and producing a first signal;

quantizing the first signal to remove intersymbol interference;

feedback filtering the quantized signal using a feedback filter having a plurality of filter taps; and subtracting the feedback filtered signal from the first signal.

6. The method as claimed in claim 5, wherein the step of delaying delays the received signal by a number of symbols at least equal to the number of taps of the feedback filter.

7. The method as claimed in claim 5, wherein the step of quantizing includes the step of subtracting the quantized signal from the first signal to produce a second error signal.

8. The method as claimed in claim 7, further including the step of adjusting the taps of the forward filter and the feedback filter by using the second error signal.

9. A filtering system for removing co-channel conventional television signal interference from a digital signal, comprising:

means for receiving the digital signal which digital signal includes a plurality of symbols, the co-channel conventional television signal interference and noise;

means for delaying the received digital signal;

feed forward adaptive filter means for adaptively filtering the delayed signal and including a plurality of adjustable taps;

means for subtracting the adaptively filtered signal from the received digital signal and for producing an error signal, and means for recursively adjusting the taps of the forward adaptive filter means by using the error signal while minimizing the mean squared error of the error signal, such that the forward adaptive filter means becomes tuned to the co-channel conventional television signal interference and produces an estimate of the co-channel conventional television signal interference.

10. The filtering system in accordance with claim 9, further including a decision feedback equalizer for removing ghosts from the received digital signal.

11. The filtering system as claimed in claim 10, wherein the delay means delays the received digital signal by a number of symbols which at least equals the number of taps of the feedback filter.

12. A method of removing co-channel conventional television signal interference from a digital signal, comprising the steps of:

receiving the digital signal which includes a plurality of symbols, noise and co-channel conventional television signal interference;

delaying the received digital signal;

adaptively filtering the delayed signal using a feed forward adaptive filter having a plurality of adjustable taps; and recursively adjusting the taps of the forward adaptive filter in accordance with an adaptive algorithm such that the forward adaptive filter becomes tuned to the co-channel conventional television signal interference and produces an estimate of the co-channel conventional television signal interference; and subtracting the estimate of the co-channel conventional television signal interference from the received digital signal.

13. The method in accordance with claim 12, further including the step of decision feedback equalizing the received digital signal.

14. A filtering system for removing co-channel conventional television signal interference from a digital signal, comprising:

means for receiving the digital signal which digital signal includes a plurality of symbols, the co-channel conventional television signal interference and noise;

means for delaying the received digital signal;

feed forward adaptive filter means including a plurality of adjustable taps for adaptively filtering the delayed signal;

means for recursively adjusting the taps of the forward adaptive filter means in accordance with an adaptive algorithm such that forward the adaptive filter means becomes tuned to the co-channel conventional television signal interference and produces an estimate of the co-channel conventional television signal interference; and first subtracting means for subtracting the estimate of the co-channel conventional television signal interference from the received digital signal.

15. The filtering system in accordance with claim 14, further including a decision feedback equalizer for removing ghosts from the received signal.

16. The filtering system as claimed in claim 15, wherein the delay means delays the received signal by a number of symbols which at least equals the number of taps of the feedback filter.

17. The filtering system in accordance with claim 15, wherein the decision feedback equalizer includes forward filtering means having a plurality of taps for forward filtering the received digital signal;

second subtracting means for subtracting the estimate of the co-channel conventional television signal interference from the forward filtered signal and producing a first signal;

quantizing means for quantizing the first signal to remove intersymbol interference;

feedback filtering means having a plurality of taps for feedback filtering the quantized signal; and wherein said second subtracting means also subtracts the feedback filtered signal from the forward filtered signal before producing the first signal.

18. The filtering system as claimed in claim 17, further including a third subtracting means for subtracting the quantized signal from the first signal to produce a second error signal.

19. The filtering system as claimed in claim 18, further including means for adjusting the taps of the forward filter and the feedback filter by using an adaptive algorithm.

20. The filtering system as claimed in claim 18, further including means for adjusting the taps of the forward filter and the feedback filter by using an LMS algorithm which is dependent upon the second error signal.

21. A method of removing co-channel conventional television signal interference from a digital signal, comprising the steps of receiving the digital signal which digital signal includes a plurality of symbols, noise and co-channel conventional television signal interference;

delaying the received digital signal;

adaptively filtering the delayed signal using a adaptive filter having a plurality of adjustable taps;

forward filtering the received digital signal using a forward filter with a plurality of adjustable taps;

subtracting the adaptively filtered signal from the forward filtered signal and producing a first signal;

quantizing the first signal;

feedback filtering the quantized signal using a feedback filter with a plurality of adjustable taps;

subtracting the filtered quantized signal from the first signal and producing an error signal; and adjusting the adjustable taps of the adaptive filter by using the error signal and an adaptive algorithm such that the adaptive filter becomes tuned to the co-channel conventional television signal interference and produces an estimate of the co-channel conventional television signal interference.

22. The method in accordance with claim 21, wherein the step of adjusting further includes the step of adjusting the taps of the forward and feedback filter using the error signal and the adaptive algorithm.

23. A filtering system for removing co-channel conventional television signal interference from a digital signal, comprising:

means for receiving the digital signal which digital signal includes a plurality of symbols, noise and co-channel conventional television signal interference;

means for delaying the received digital signal;

adaptive filter means having a plurality of adjustable taps for adaptively filtering the delayed signal;

forward filter means having a plurality of adjustable taps for forward filtering the received digital signal;

first subtracting means for subtracting the adaptively filtered signal from the forward filtered signal and producing a first signal;

means for quantizing the first signal;

feedback filter means having a plurality of adjustable taps for feedback filtering the quantized signal;

second subtracting means for subtracting the filtered quantized signal from the first signal and producing an error signal; and adjusting means for adjusting the adjustable taps of the adaptive filter by using the error signal and an adaptive algorithm such that the adaptive filter becomes tuned to the co-channel conventional television signal interference and produces an estimate of the co-channel conventional television signal interference.

24. The filtering system in accordance with claim 23, wherein the adjusting means includes means for adjusting the taps of the forward and feedback filters using the error signal and the adaptive algorithm.

25. A television receiver including a filtering system for removing conventional television signal interference from a digital signal, the filtering system comprising:

means for receiving the digital signal which digital signal includes a plurality of symbols, the co-channel conventional television signal interference and noise;

means for delaying the received digital signal;

feed forward adaptive filter means including a plurality of adjustable taps for adaptively filtering the delayed signal;

means for recursively adjusting the taps of the forward adaptive filter means in accordance with an adaptive algorithm such that the forward adaptive filter means becomes tuned to the co-channel conventional television signal interference and produces an estimate of the co-channel conventional television signal interference; and first subtracting means for subtracting the estimate of the co-channel conventional television signal interference from the received digital signal.

26. A television receiver including a filtering system for removing conventional television signal interference from a digital signal, the filtering system comprising:

means for receiving the digital signal which digital signal includes a plurality of symbols, the co-channel conventional television signal interference and noise;

means for delaying the received digital signal;

feed forward adaptive filter means for adaptively filtering the delayed signal and including a plurality of adjustable taps;

means for subtracting the adaptively filtered signal from the received digital signal and for producing an error signal; and means for recursively adjusting the taps of the forward adaptive filter means by using the error signal while minimizing the mean squared error of the error signal, such that the forward adaptive filter means becomes tuned to the co-channel conventional television signal interference and produces an estimate of the co-channel conventional television signal interference.

27. A television receiver including a filtering system for removing conventional television signal interference from a digital signal the following system comprising:

means for receiving the digital signal which digital signal includes a plurality of symbols, noise and co-channel conventional television signal interference;

means for delaying the received digital signal;

adaptive filter means having a plurality of adjustable taps for adaptively filtering the delayed signal;

forward filter means having a plurality of adjustable taps for forward filtering the received digital signal;

first subtracting means for subtracting the adaptively filtered signal from the forward filtered signal and producing a first signal;

means for quantizing the first signal;

feedback filter means having a plurality of adjustable taps for feedback filtering the quantized signal;

second subtracting means for subtracting the quantized signal from the first signal and producing an error signal; and adjusting means for adjusting the adjustable taps of the adaptive filter by using the error signal and an adaptive algorithm such that the adaptive filter becomes tuned to the co-channel conventional television signal interference and produces an estimate of the co-channel conventional television signal interference.

* * * * *